UNITED STATES PATENT OFFICE.

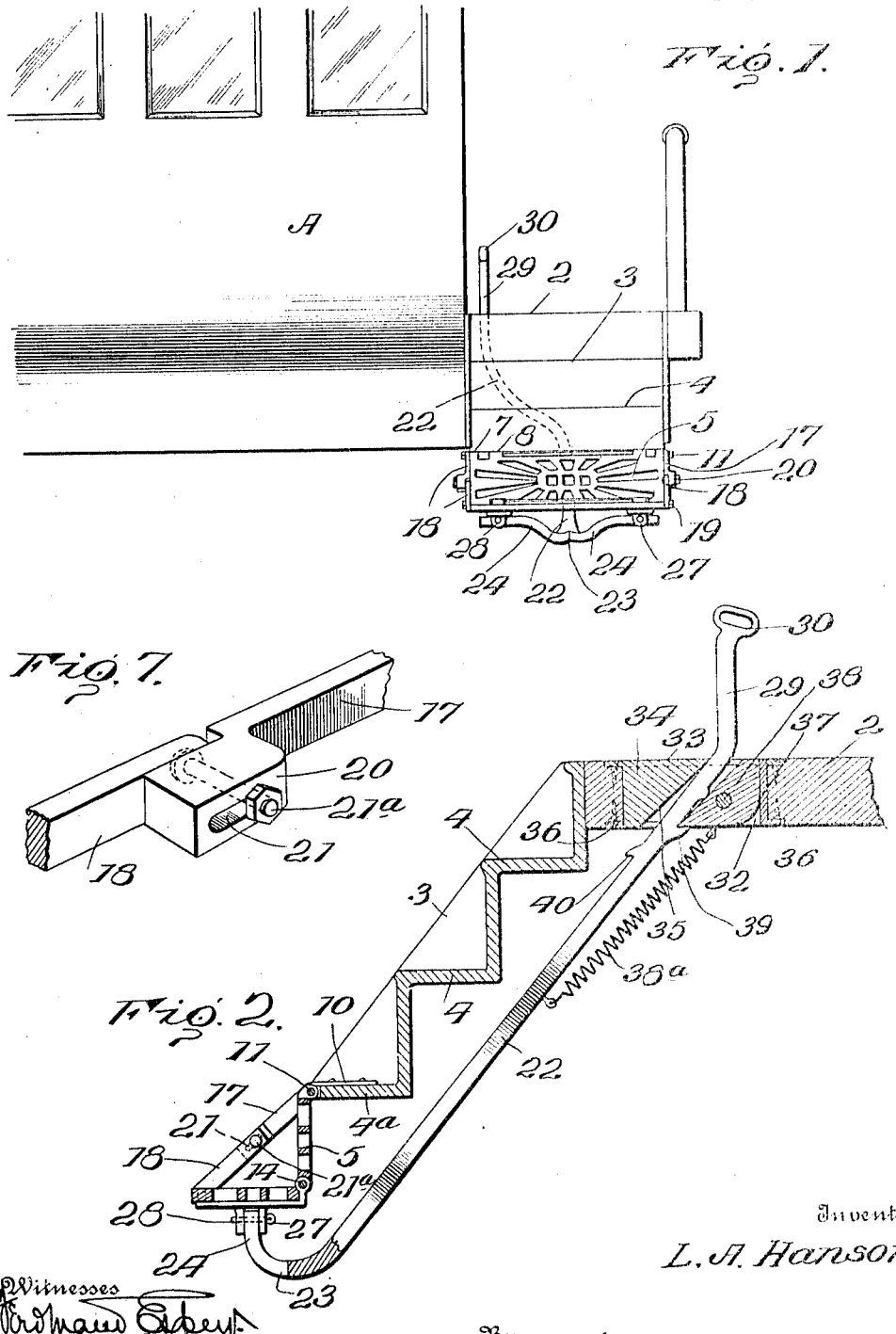

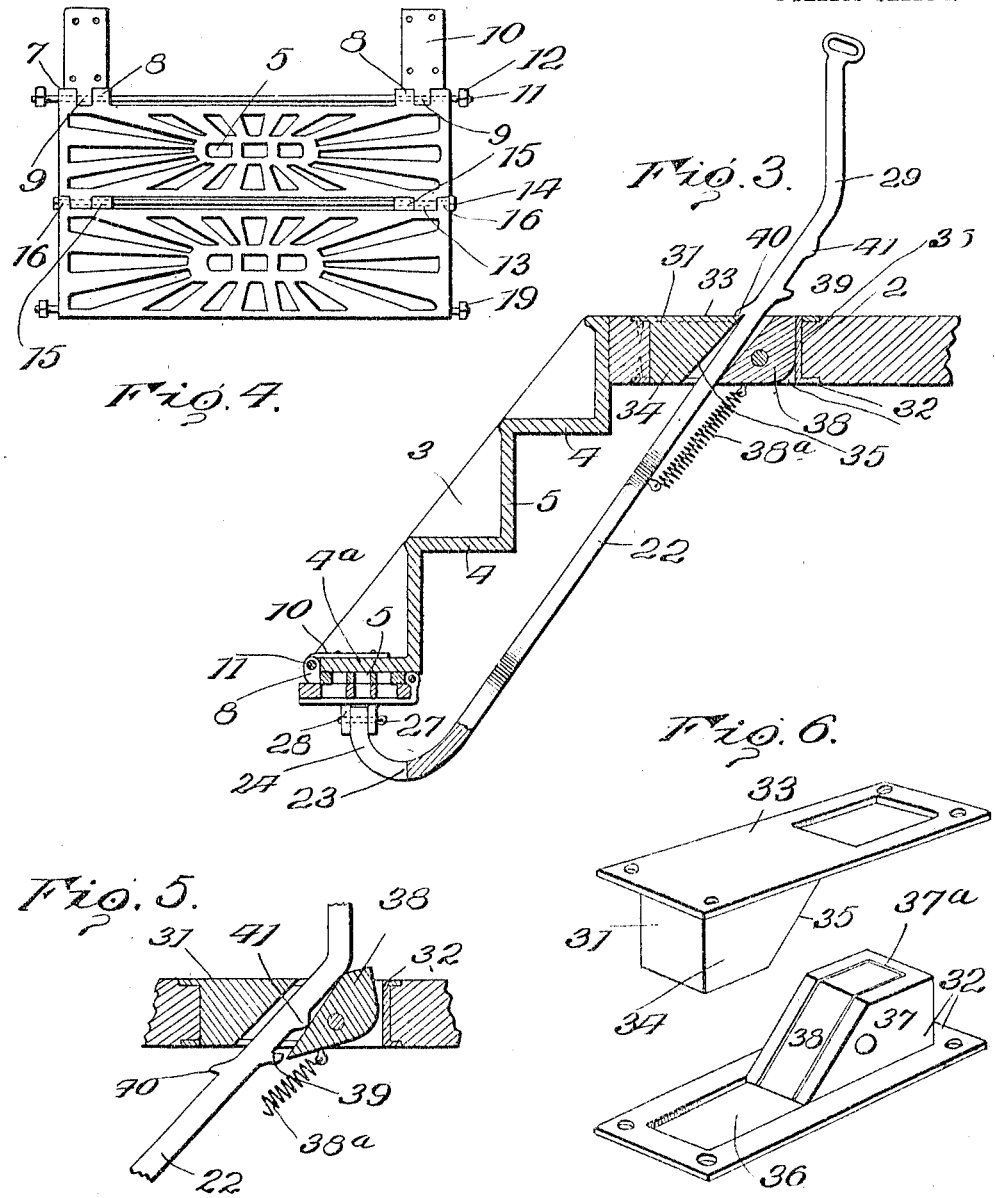

LENNIE A. HANSON, OF DEERING, NORTH DAKOTA.

EXTENSION CAR-STEP.

1,096,837.   Specification of Letters Patent.   Patented May 19, 1914.

Application filed July 21, 1913. Serial No. 780,325.

*To all whom it may concern:*

Be it known that I, LENNIE A. HANSON, citizen of the United States, residing at Deering, in the county of McHenry and State of North Dakota, have invented certain new and useful Improvements in Extension Car-Steps, of which the following is a specification.

My invention relates to car steps and particularly to steps adapted to be attached to either railway coaches, or street-cars.

The primary object of my invention is the provision of a foldable step adapted to be attached to the permanent steps of a street-car or railway coach, and adapted to be folded up when not in use beneath the lowest permanent tread or step or extended downward below the latter so as to bring the tread or step relatively near to the ground, thus avoiding the inconvenience due to the height of the car steps now in use, while at the same time securing all of the advantages incident to the high car step.

A further object of the invention is the provision of a foldable step attached to the lowest step or tread of the permanent steps of the car and which is adapted to be operated by mechanism on the car platform.

A further object of the invention is the provision of a step of this character so constructed that it will be firmly supported when either in a raised or lowered position.

A further object of the invention is the provision of a step which shall be simple in its construction and which may be readily added to the permanent steps now in use on cars.

Other objects will appear in the course of the following description.

My invention is illustrated in the accompanying drawings, wherein:

Figure 1 is a side elevation of a portion of the car with the car platform of my improved supplementary step attached thereto. Fig. 2 is an enlarged vertical sectional view through a portion of the car platform and the steps on one side thereof, showing my supplementary step open. Fig. 3 is a like view to Fig. 2, but showing the supplementary step closed. Fig. 4 is a face view of the tread and riser forming the supplementary step. Fig. 5 is a fragmentary section on the same line as the section in Fig. 3 but showing the parts in the position taken by them to raise the step. Fig. 6 is a perspective view of the guide members removed from the platform and separated from each other. Fig. 7 is a detail perspective view of the joint between the links.

Corresponding and like parts are referred to in the following description and indicated in all the views of the accompanying drawings by the same reference characters.

Referring to these drawings, A designates a car of any suitable construction and 2 one of the platforms thereof, having a series of permanent steps 3. These permanent steps each consist, of course, of treads and risers, and as illustrated there are three treads designated 4. The platform and the permanent steps may be of any suitable construction, as my invention is adapted to be applied to any ordinary form of car.

My improved foldable step comprises a riser 5 and a tread 6. These are preferably made of metal in more or less ornamental form. The riser 5 is formed at one edge with the ears 7 and 8 at each end, the ears 7 and 8 being spaced from each other to provide for the reception of the knuckle 9 of a hinge-member 10 which is adapted to be attached in any suitable manner to the under side of the lowermost permanent step 4ª. The ears 7 and 8 are of course, transversely perforated for the passage of a pintle 11, this pintle being provided with nuts 12 at its extremities. The opposite edge of the riser 5 is provided with the ears or lugs 13 which are transversely perforated, for the passage of a pintle 14. The tread, or step 6 is provided upon one edge with the ears 15 and 16 between which the ears 13 on the riser 5 extend. These ears 15 and 16 are of course, transversely perforated for the passage of the pintle 14. This pintle 14 is provided on its ends with nuts as previously described for the pintle 11. Preferably the riser 5 and tread 6 are made of ornamental iron work, in the form of a grille, so as to make the steps as light as possible.

It will be noted that the pintle 11 projects out beyond the lateral ends of the riser 5. This is for attaching the upper members of a pair of jointed links which connect the edge of the riser which is hinged to the permanent step to the free edge of the tread-plate 6. These links are designated 17 and 18. There are a pair of these links 17 and 18 on each end of my supplementary step.

The links 17 are pivoted upon the pintle 11, while the links 18 are pivoted at their lower ends to the free edge of the tread-plate 6, by means of stud-bolts 19 or in any other suitable manner. The link 17 is enlarged at 20, and laterally offset or deflected and provided with a slot 21. The upper end of each of the links 18 is provided with a pin 21ª which operates within this slot. It is to be noted here that the end 20 of the link 17 is relatively heavy, so that as the step or tread-plate 6 is folded into parallelism with the riser-plate 5, the weighted or heavy end 20 of each link 17 will tend to cause the pair of links to break downward. These links 17 and 18, however, will fully support the tread-plate 6 in a horizontal position, as will more fully appear later.

The plates 5 and 6 are intended to be folded upward and into a parallel position beneath the lowermost permanent tread 4ª, as is shown in full lines in Fig. 3, and for the purpose of so folding the supplementary step I provide an actuating rod designated 22. This rod is preferably square in section and extends upward parallel to the angle of the permanent steps and beneath the same. At its lower end the rod 22 is bent upward and is laterally bifurcated at 23 to form two arms 24 which extend beneath the tread-plate 6 and which at their ends are pivotally connected by bolts 27 to ears 28 extending downward from the under side of the tread-plate. It will thus be seen that the actuating rod 22 is pivotally connected to the tread-plate 6 so that this plate may always retain its horizontal position, as the actuating rod is moved upward or downward. The upper end of the actuating rod passes diagonally through the car platform and is then extended upward as at 29 and is formed at its upper end with a handle 30. This handle is in the form of an enlarged loop whereby the operator may secure a firm grip upon the actuating rod so as to readily raise, lower, and then swing it to its proper positions.

The actuating rod passes through a guide, the passage in the guide through which the rod passes being downwardly and outwardly inclined so that in order to fold up the supplementary step the rod has not only to be pulled upward vertically, but must be pulled inward, as shown in full lines in Fig. 3. A reverse motion is necessary in shifting the supplementary step from its folded position to its open position. While I do not wish to be limited to any particular form of guide, I preferably form the guide as illustrated in Fig. 6. A recess is made within the car platform which is rectangular in form. The guide is made in two sections, 31 and 32. The section 31 comprises a rectangular frame 33 which is slightly larger in area than the area of the rectangular opening in the car platform and which has formed with it or attached to it the downwardly projecting metallic block 34. This block is disposed at one end of the frame 33 and the inner face of the block is downwardly and outwardly beveled or inclined as at 35. The member 32 has the same general form as the member 31 but is reversed in position. It comprises the rectangular frame 36 and an upwardly extending block 37, this block being hollow or recessed as at 37ª. Pivoted within this recess is the section 38 having a downwardly and outwardly extending face confronting the face 35 of the block 34 but spaced therefrom. The corner of the section 38 opposite to the inclined face is rounded so that the section may turn upon its pivot. A spring 38ª is attached to the section somewhat in advance of its pivot as illustrated in Fig. 5.

When in position the confronting faces of the block 34 and removable section 38 are spaced from each other a distance slightly greater than the thickness of the rod 22 so that the rod 22 may have a certain amount of rocking play or motion within the space defined by the guide blocks and so that the rod may rock upon the upper corner of the block 34 as upon a fulcrum. The rod 22 is provided upon its under face with a projecting lug or stop 39 which is adapted to contact with the lower corner of the section 38 as illustrated in Fig. 3. The upper face of the actuating rod 22 is formed with a transverse lug or stop 40 which is adapted to engage with the upper corner of the block 34 when the rod is raised. Above the lug 39 the block is also formed with a transverse rib 41 adapted to engage with the face of the section 38 when the parts are in the position shown in Fig. 5. The operation of this rod is as follows: Assuming that the step is lowered it will be seen from Fig. 2, that the lower end of the rod 22 will be urged vertically downward by the weight of the step and the weight of the rod below the stop 39, thus the rod will fulcrum on the protuberance 41 and the upper portion of the rod above this fulcrum point will contact against the upper portion of the inclined face of the block 34 while the lug 39 will engage beneath the lower corner of the section 38, thus when the step is down it is impossible for the sections to fall back as the stop 39 resting against the corner of the section 38 prevents the rod 22 from moving upward.

In order to raise the step the operator presses the handle rearward which rocks the rod 22 upon the fulcrum 41 and at the same time acts to rotate the section 38 in the position shown in Fig. 5. This releases the stop 39 from its engagement with the lower corner of the section 38. The rod 22 may then be pulled laterally and upward into the position shown in Fig. 3 until the stop 40 engages with the upper corner of the block 34. Now when the rod is released the weight of the steps and the lower portion of the rod 22 causes the rod 22 to fulcrum upon the lower corner of the section 38 and throws the face of the rod inward against the block 34, again automatically locking the rod 22 in its raised position.

It will be particularly noted that as soon as the rod 22 is drawn upward to fold the step the heavy ends 20 of the links 17 will cause the links to break and the conjoined ends thereof to move downward and fold so as to permit of the folding of the steps. It will be noted that the guide section 38 always retains its horizontal position when the step is in either its raised or lowered position. This is for the reason that the large end of the section 38 is disposed rearward of the pivot of the block. If the section 38 did not turn back to its original position when the rod is lowered it would not engage with the lug 39. The spring 38ª, it will be seen, permits the actuating rod to be operated more freely than if no spring were used. This spring will aid the operator in lifting the rod and the spring is of such length and tension that it only exerts a pulling force when the rod is in its lowered position and it will exert no pulling force when the rod 22 is raised.

It will be seen that the steps when folded, are disposed beneath the lowermost tread 4ª of the car, in such position that they do not project out beyond the sides of the car and in such position that the steps will not collect dust or dirt, or be likely to strike an obstacle.

When used on railway cars this foldable step obviates the necessity of a porter placing a stool upon the station platform, as is necessary today and when used on street cars this foldable step adds very greatly to the convenience of persons entering or leaving the car.

It is to be particularly noted that the vital feature of my invention is the diagonally movable actuating rod and the step tread 6 mounted thereon. By shifting the rod diagonally downward and outward, the step tread may be carried from a position beneath the lowest permanent tread of the permanent car step to a position below and in advance of said lowest step, or by shifting the rod forward the step tread may be carried up to a position parallel with and underneath the lowest step tread of the permanent steps. It is, however, preferable to provide the riser, as thereby strain is to a large extent, taken off of the actuating rod. This is particularly true where the riser and supplementary step are connected by means of the jointed links 17 and 18.

While I have illustrated what I believe to be the best form of my invention, it will be entirely obvious that various modifications may be made therein without departing from the spirit of the device, and that I do not wish to be limited to the precise construction illustrated, either as regards the particular form and structure of the step and riser itself, or as to the particular form of actuating device and the means for holding it in position. I hold, however, that the form illustrated, is the best embodiment of my invention, for the reason that the step and riser may be readily cast, readily assembled, and readily attached to cars already in use and because the actuating rod is automatically locked or held in either its raised or lowered position.

What I claim is:

1. The combination with a platform, of a foldable step therefor including a riser hingedly supported at its upper edge, a tread hinged to the riser, and an actuating member operatively connected to the tread and movable into a position to fold the tread and riser upward into parallel horizontal planes or downward to carry the riser into a vertical plane and the tread into a horizontal plane in advance of the riser.

2. The combination with a platform, of a foldable step therefor including a riser hingedly supported at its upper edge, a tread hinged to the lower edge of the riser, oppositely disposed pairs of links disposed at each end of the tread and riser, one of said links of each pair having a sliding pivotal engagement with the other link of the pair, and one of said links of each pair at its point of pivotal engagement with the other link being weighted to cause the link to break when the riser and tread are folded into parallel position, and actuating means operatively engaging the tread and adapted to shift the tread and riser upward into parallel horizontal planes or downward into a position where the tread is at right angles to the riser.

3. The combination with a platform and a step tread therefor, of a rod extending diagonally downward and outward through the platform and longitudinally shiftable therethrough, said rod being connected at its lower end to the under side of the step tread, and a fulcrum carried by the platform and engaging the under face of the rod above the middle thereof at all times, whereby to permit the upper end of the rod to rock forward and engage the platform to hold the rod in adjusted position.

4. In a mechanism of the character described, a platform having a downwardly and outwardly extending slot, an actuating rod passing through said slot, said actuating rod being less in thickness than the depth of the slot whereby the actuating rod may rock upon the lower inner corner of the slot as upon a fulcrum, and a supplementary step tread carried upon the lower end of the rod.

5. In a mechanism of the character described, a platform having a rectangular recess therein, opposed guiding members mounted in said recess, one guiding member having a downwardly and outwardly inclined inner face, the other guiding member having an upwardly extending block formed with a downwardly and outwardly inclined inner face, the inner face of one block being spaced from the inner face of the other block, the two faces defining a diagonal passage through the platform, an actuating rod passing through said passage and extending downward and outward, the actuating rod having a thickness less than the space defined by the diagonal faces of the guiding blocks whereby the actuating rod may fulcrum upon the lower inner corner of the second named guiding block, and a supplementary step tread attached to the lower end of said actuating rod and shiftable therewith.

6. In a mechanism of the character described, a platform having a rectangular recess therein, permanent steps connected to said platform, opposed guiding members mounted in said recess, one guiding member having a downwardly and outwardly inclined inner face, the other guiding member having an upwardly extending block formed with a downwardly and outwardly inclined inner face, the inner face of one block being spaced from the inner face of the other block, the two faces defining a diagonal passage through the platform, an actuating rod passing through said passage and extending downward and outward, the actuating rod having a thickness less than the space defined by the diagonal faces of the guiding blocks whereby the actuating rod may fulcrum upon the lower inner corner of the second named guiding block, a riser plate hingedly attached to the lower end of said permanent steps and adapted to fold beneath the lowermost step, a step tread hingedly attached to the lower edge of the riser plate, and pivotal connections between the under face of the step tread and the lower end of the actuating rod.

7. In a mechanism of the character described, a platform having a rectangular recess therein, permanent steps connected to said platform, opposed guiding members mounted in said recess, one guiding member having a block formed with a downwardly and outwardly inclined inner face, the other guiding member having an upwardly extending block formed with a downwardly and outwardly inclined inner face, the inner face of one block being spaced from the inner face of the other block, the two faces defining a diagonal passage through the platform, an actuating rod passing through said passage and extending downward and outward, the actuating rod having a thickness less than the space defined by the diagonal faces of the guiding blocks whereby the actuating rod may fulcrum upon the lower inner corner of the second named guiding block, a riser plate hingedly attached to the lower end of said permanent steps and adapted to fold beneath the lowermost step, a step tread hingedly attached to the lower edge of the riser plate, pivotal connections between the under face of the step tread and the lower end of the actuating rod, and jointed links connecting the outer edge of the step tread with the upper edge of the riser.

8. In a mechanism of the character described, a platform having a downwardly and outwardly extending slot, an actuating rod passing through said slot and being less in thickness than the depth of the slot whereby the actuating rod may rock upon the lower inner corner of the wall of the slot as upon a fulcrum, a lug formed upon the inner face of the actuating rod and adapted to engage said fulcrum when the rod is in its lowered position, and a supplementary step tread carried upon the lower end of the rod.

9. In a mechanism of the character described, a platform having a downwardly and outwardly extending slot, an actuating rod passing through said slot and being less in thickness than the depth of the slot whereby the actuating rod may rock upon the lower inner corner of the wall of the slot as upon a fulcrum, said rod being formed upon its inner face near its upper end with a lug adapted to engage said corner to impede the upward movement of the actuating rod through the slot, the opposite face of the rod being formed with a lug disposed below the level of the first named lug and adapted to engage the lower corner of the outer wall of the slot whereby to wedge the rod into engagement with the said fulcrum formed by the opposite corner.

10. In a mechanism of the character described, a platform having a rectangular recess therein, permanent steps connected to said platform, opposite guide members mounted in said recess, one guide member having a block formed with a downwardly and outwardly inclined inner face, the other guide member having a recessed block, a movable section pivoted in the recess of said block and having a downwardly and outwardly inclined face confronting the face of the opposite block, the two faces defining a diagonal passage through the platform, an actuating rod passing through said passage and extending downward and outward, said rod having a thickness less than the space defined by the diagonal faces of the guide blocks, whereby the actuating rod may fulcrum upon the lower inner corner of the second named guide block, a riser plate integrally attached to the lower end of the permanent steps and adapted to fold beneath the lowermost step, a step tread hingedly attached to the lower edge of the riser plate, pivotal connections between the under face of the step tread and the lower end of the actuating rod and jointed links connecting the outer edge of the step tread with the upper edge of the riser.

In testimony whereof I affix my signature in presence of two witnesses.

LENNIE A. HANSON. [L. S.]

Witnesses:
　Guy E. Davis,
　P. L. Calkins.